Patented Mar. 9, 1948

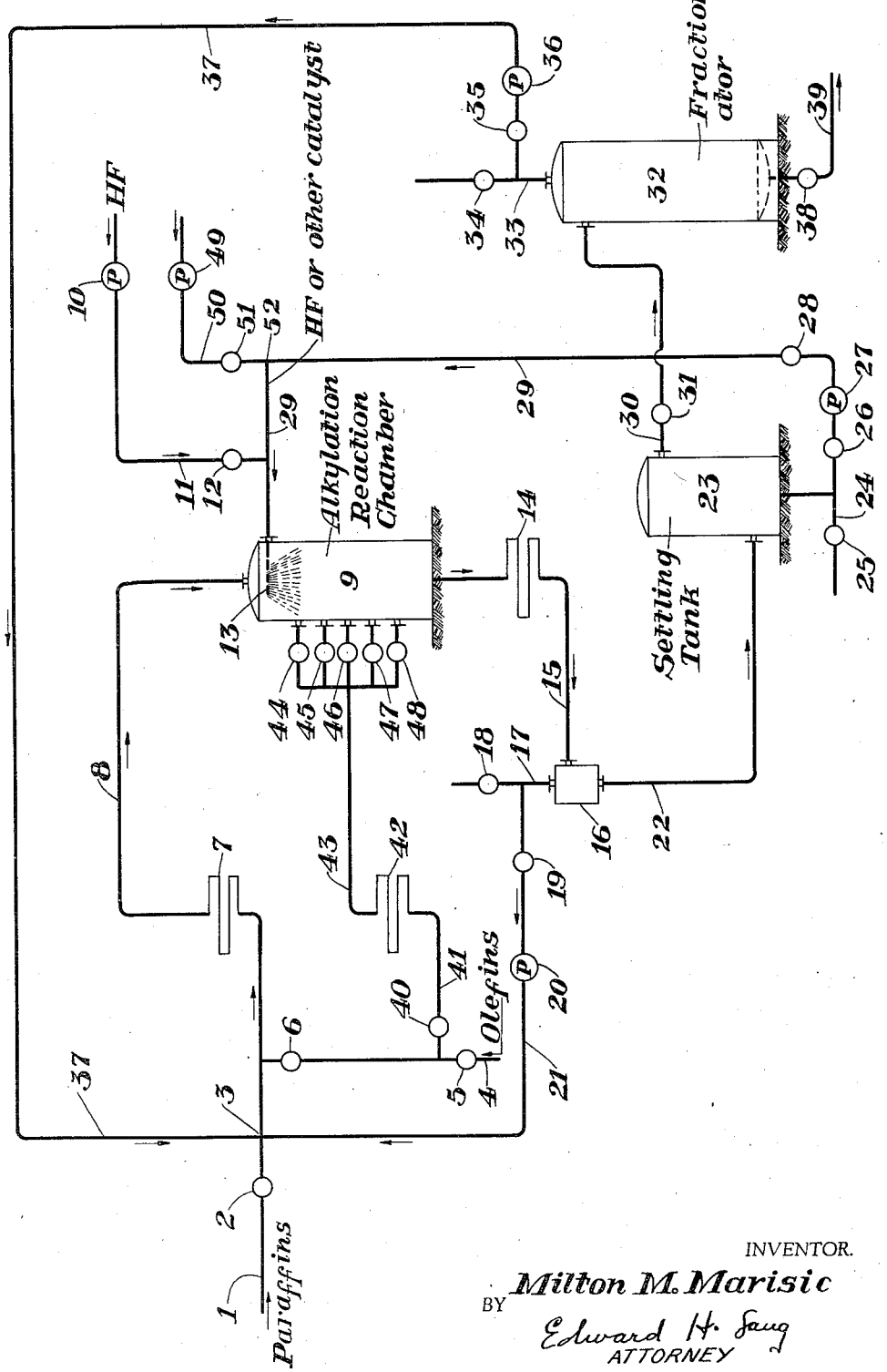

2,437,544

UNITED STATES PATENT OFFICE 2,437,544

HYDROFLUORIC ACID ALKYLATION PROCESS

Milton M. Marisic, Northfield, Ill., assignor to The Pure Oil Company, Chicago, Ill., a corporation of Ohio Application August 2, 1944, Serial No. 547,671

4 Claims. (Cl. 260—683.4)

This invention relates to improvements in a method for condensing or alkylating paraffinic hydrocarbons with mono-olefinic hydrocarbons and is more particularly directed to a process carried out with the hydrocarbons in gaseous state and in the presence of a finely dispersed liquid catalyst and preferably one which is capable of vaporization under alkylation conditions of temperature and pressure.

An object of this invention is to provide an improved method for alkylating or condensing paraffinic hydrocarbons with olefinic hydrocarbons.

Another object of the invention is to provide a method for better controlling reaction of paraffinic with olefinic hydrocarbons in the presence of liquid alkylation catalysts.

Still another object of the invention is to shorten the time required for reaction of paraffinic with olefinic hydrocarbons in the presence of liquid alkylation catalysts.

A further object of the invention is to provide a method for condensing or alkylating paraffinic hydrocarbons with olefinic hydrocarbons in gaseous phase in the presence of anhydrous hydrofluoric acid.

Other objects of my invention will become manifest from the following description and the accompanying drawing of which the figure is a diagrammatic flow diagram of apparatus for carrying out the invention.

My invention resides in contacting normal and/or isoparaffinic hydrocarbons with mono-olefins in gaseous phase, with finely divided liquid alkylation catalyst such as anhydrous liquid hydrogen fluoride. I prefer to use a catalyst which is capable of vaporizing under alkylation conditions. Contact between the hydrocarbons and hydrogen fluoride or other catalyst preferably takes place at temperatures and pressures approaching critical conditions for the catalyst, so that the exothermic heat of the reaction is absorbed in vaporizing the hydrofluoric acid instead of raising the temperature of the reactants. Not only is the temperature controlled, thus preventing side reactions with concomitant formation of undesirable reaction products, but by partial vaporization of hydrofluoric acid, new surfaces are presented for catalysis of the hydrocarbon gases, thereby increasing the rate of reaction.

The catalyst particles may be present in the reaction zone in the form of droplets, spheroids, mist or fog and may range in size from diameters of 0.1 mm. or less to 10 mm. My invention also contemplates using the catalyst in thin layers by flowing it through a bed or inert packing material such as Raschig rings, beads, pellets or broken fragments in the reaction chamber.

Referring now to the drawing, the numeral 1 indicates an inlet line for charging paraffins, isoparaffins or a mixture thereof, such as, for example, a butane fraction containing approximately 30% of isobutane, obtained from natural gas. It will be understood that the paraffinic charge may contain paraffins and isoparaffins other than normal and isobutane and that the paraffinic fraction may be obtained from any available source, as, for example, by fractionation of stabilizer gas from an oil cracking operation, followed by polymerization of the olefins in the gas.

The paraffinic charging gas is charged through valve 2 to line 3 where it is mixed with olefinic hydrocarbons, such as, for example, a fraction rich in butylenes and/or propylenes which enters through line 4, controlled by valves 5 and 6. The olefinic fraction may be obtained from any available source, as for example by catalytic dehydrogenation of butane or by absorption from stabilizer gas from an oil cracking operation. A mixed paraffin-olefin gas from thermal or catalytic cracking operations may also be charged through either lines 1 or 4. The paraffinic and olefinic gases are mixed in such proportions that the paraffins are present in large excess over olefins. Where the process is carried out under conditions such as to selectively alkylate isoparaffins, the mole ratio of isoparaffins to olefins may be approximately 5 to 1.

The combined hydrocarbons pass from line 3 to heat exchanger 7, which serves as a heater or cooler depending on the temperature of the gases entering the system and the temperature desired in the reaction zone. Where the reaction is carried out for the purpose of selectively alkylating isoparaffins, temperature of the products leaving the exchanger 7 may range from approximately atmospheric to 125° F. and preferably closer to the latter temperature. From the exchanger 7 the hydrocarbons pass through line 8 into the top of reaction chamber 9. Liquid anhydrous hydrofluoric acid or other suitable catalyst at storage temperature is pumped at a pressure above its critical pressure at the temperature that is the maximum preferred alkylation temperature, into top of the reactor by means of pump 10 through line 11 controlled by valve 12, to atomizer 13 located near the upper end of the reaction chamber. For example when the temperature of the products leaving the reactor is approximately 125° F., hydrofluoric acid is pumped into the reactor under a pressure of approximately 40 to 100 pounds per square inch, which pressure is maintained in the reaction chamber. The liquid hydrofluoric acid leaves the atomizer 13 in the form of finely divided droplets which become intimately dispersed with the hydrocarbon gases passing downwardly through the chamber. In the presence of the finely divided droplets of hydrofluoric acid, olefins react with isoparaffins to form higher boiling branch-chain paraffin hydrocarbons.

Although sufficient pressure may be maintained in reaction chamber 9 to prevent vaporization of hydrogen fluoride and heat exchangers may be provided for dissipating exothermic heat of reaction, I prefer to operate at a pressure above the critical pressure of hydrogen fluoride at the desired reaction temperature such that partial vaporization of hydrogen fluoride will result upon development of exothermic heat of reaction tending to raise the temperature above the desired reaction temperature. By operating under these conditions the heat of reaction will be utilized in vaporizing hydrofluoric acid instead of raising the temperature in the reaction zone to a point where undesirable side reactions occur. Furthermore, partial vaporization of hydrofluoric acid provides new reaction surfaces on the droplets which are more active in accelerating the alkylation reaction than surfaces already covered with alkylate.

In practicing the present invention, the pressure maintained on the reactor may be established by a simple calculation. To permit partial vaporization of the catalyst during the alkylation, the required pressure is equal to the sum of the vapor pressure of the liquid catalyst at the temperature corresponding to the desired alkylation temperature and the partial pressure of the reactants. Preferably, the pressure is slightly higher than this sum to insure proper operation and allow for the pressure drop through the reactor, which is in part due to the decrease in volume and pressure resulting from the combination of the reactants to form the alkylate. Since the main pressure drop is dependent on the design of the reactor, exact figures for this cannot be stated. For example, where hydrofluoric acid catalyzed alkylation is conducted at 125° F., the pressure is determined as follows. The vapor pressure of liquid hydrofluoric acid at 125° F. is 37 pounds per square inch absolute. The partial pressure of the desired quantity of reactants admitted to the reactor is 18 pounds per square inch. Hence, the required pressure is 37 plus 18, or 55 pounds per square inch absolute or 40 pounds gauge.

By carrying out the reaction with the hydrocarbons in the gaseous state and with the hydrofluoric acid or other catalyst in the form of finely divided droplets, the reaction takes place in a much shorter period of time than has heretofore been required in hydrofluoric alkylation of isoparaffins with olefinic hydrocarbons. The time required for reaction may vary from approximately a fraction of a second to 1 minute, as compared to reaction times of approximately 6 minutes to several hours required in processes heretofore disclosed in the art.

The effluent composed principally of a mixture of liquid and gaseous hydrogen fluoride or other catalyst, unreacted paraffinic and olefinic hydrocarbons and liquid alkylate leaves the bottom of reaction chamber 9 through condenser 14, where vaporized hydrogen fluoride is condensed to liquid. The partially condensed effluent passes through line 15 to gas separator 16 where the uncondensed gases, such as isobutane, normal butane and butylenes may be removed through line 17, controlled by valve 18 and withdrawn for any desired purpose as, for example, alkylation in another unit. Instead of withdrawing the gases, they may be recycled through valve 19 by means of compressor 20, through line 21 back to line 3 where they are mixed with fresh paraffinic and olefinic hydrocarbons for charging to the process.

The liquid remaining in separator 16 may either continuously or intermittently be withdrawn through line 22 to settling tank 23 wherein liquid hydrogen fluoride or other catalyst separates at the bottom as a heavy layer and the alkylate forms a supernatant layer. Liquid hydrogen fluoride or other catalyst may be withdrawn through line 24 controlled by valve 25 as it becomes spent and requires purification. The remainder of the liquid catalyst passes through valve 26 and is pumped by means of pump 27 through valve 28 and line 29 back to the top of reaction chamber 9. Fresh or purified make-up catalyst is introduced as required through line 11.

The alkylate from tank 23 is withdrawn through line 30 controlled by valve 31 to fractionator 32. Any light unconverted hydrocarbons, as well as any hydrogen fluoride or other volatile catalyst in the alkylate passes from the fractionator 32 through line 33 and may be withdrawn from the system through valve 34; or the overhead from fractionator 32 may pass through valve 35, compressor 36 and line 37 to line 3 for recycling to the process with fresh gases. The alkylate boiling within or above the gasoline boiling range is withdrawn from fractionator 32 through valve 38 and line 39 for further treatment, as for example, by means of water and dilute alkali washing, or contacting at temperatures of approximately 75–500° F. with adsorbents such as bauxite or alumina for the purpose of removing residual traces of alkyl fluorides, hydrogen fluorides or other impurities. The treated alkylate may then be fractionated to separate fractions suitable for aviation gasoline.

The entire system may be operated without release of pressure other than the pressure drop which occurs through the system; or pressure may be released prior to the time the alkylate enters the fractionator 32.

When carrying out the process as hereinabove described at 125° F. and 40 to 100 pounds per square inch pressure in the presence of finely dispersed liquid hydrofluoric acid with a charging stock comprising substantially only normal and isobutanes and butylenes, with recycling of unreacted hydrocarbons, over 90% of the isobutane can be converted to octanes consisting chiefly of 2-2-4 trimethyl pentane and 2-2-3 trimethyl pentane. The process is applicable to alkylation of other paraffins with olefins, as for example alkylation of iso- or normal pentane with propylene to form iso-octanes, and alkylation of iso- or normal pentane with butylenes to form branched-chain nonanes. Catalysts other than hydrofluoric acid, such as combinations of sulfuric and hydrofluoric acids, boron trifluoride and hydrofluoric acid or sulfur dioxide and hydrofluoric acid, and boron trifluoride-water complex or phosphoric acid, can be used.

In order to aid in suppressing polymerization of olefins during the alkylation reaction, it may be desirable to maintain the olefin concentration very low at all points in the reaction zone by injecting olefins at spaced points in the reaction zone so that the ratio of olefins to isoparaffins at any point in the reaction zone is not more than approximately 1 mole of the former to 10 moles of the latter. This may be accomplished by charging the olefins from line 4 through valve 40 and line 41 to heat exchanger 42, then through line 43 and a manifold controlled by valves 44, 45, 46, 47 and 48.

Instead of withdrawing the effluent from reaction chamber 9 through a condenser 14, separator 16 and tank 23, a fractionating column may be provided in lieu of these elements, to which is charged the effluent from reaction chamber 9. The provision of a fractionating column at this point is particularly advantageous where the process is operated at more elevated temperatures such as are necessary for alkylation of normal paraffins, and at which temperatures a major portion or all of the hydrogen fluoride is converted to gaseous state in the reaction chamber. The reaction column would be operated under such conditions as to separate overhead a light hydrocarbon fraction for recycling, an intermediate liquid hydrogen fluoride fraction which could be withdrawn as a side stream, and a bottom fraction composed chiefly of alkylate. The alkylate would then be charged to fractionator 32 for treatment as previously described.

Instead of recycling the entire overhead from fractionator 32 to line 3, fractionator 32 may be operated in such manner as to separate normal from isobutane, the isobutane recycled to the process and the normal butane fraction charged to a separate similar unit operated at higher temperatures.

In addition to charging the hydrocarbon reactants in gaseous state through line 8 to the top of reaction chamber 9, low boiling hydrocarbons may be charged in liquid state, preferably admixed with hydrofluoric acid or other catalyst in order to assist in controlling the temperature in the reaction chamber. For example, a mixture of olefinic and paraffinic hydrocarbons in proper ratio for reaction may be charged in liquid state by pump 49 through line 50 and valve 51, to be mixed at point 52 with the recycled hydrofluoric acid. Droplets of liquid hydrocarbon which emerge from atomizer 13 will be vaporized by the heat of reaction and thus absorb the heat, thereby preventing rise in temperature. The amount of liquid hydrocarbon charged to the reaction zone should be regulated to maintain the reaction temperature approximately constant.

Although I have shown and described a concurrent operation, the process may be carried out countercurrently with the hydrocarbons entering the reaction chamber near the lower end thereof and the liquid hydrogen fluoride or other catalyst entering near the upper part of the chamber as shown. In the countercurrent operation, means would have to be provided at the top of the chamber for withdrawing vapors therefrom and for receiving them for further treatment.

Instead of conducting a countercurrent operation in which both the reactants and hydrogen fluoride or other catalyst pass downwardly through the chamber, the reactants and catalyst may be charged to the bottom of the chamber in an upward direction and the hydrocarbon gas stream used to carry the liquid particles out of the chamber from the top thereof to a condenser and receiver for further separation and fractionation as previously shown and described.

In place of a reaction chamber a tubular reactor may be used composed of a bundle of enclosed vertical tubes adapted to be surrounded by heat exchange medium. The reactants and catalyst would pass through the tubes.

My process has the advantage over previous alkylation processes in that the time required for reaction is reduced to a few seconds. Reduction in time not only enables larger through-put through any particular unit, but cuts down the formation of undesirable reaction products. Long reaction times result to some extent in partial cracking of already formed alkylate, rearrangement and further alkylation of the cracked products. These secondary products are generally of less value than the original alkylate because of their lower anti-knock value. Short reaction periods reduce secondary reactions to a minimum. In addition to the secondary hydrocarbon reaction products which may form during long contact periods, there is formed a small quantity of alkyl fluorides which may range from approximately 0.1 to 2% of the alkylate. In addition to decreasing the yield of alkylate the alkyl esters cause an increased problem in purification. By operating in accordance with my process only traces of alkyl fluorides or other esters are formed.

It will be seen, therefore, that I have succeeded in developing a process which may be carried out much more rapidly than hydrofluoric acid processes heretofore developed, and which is capable of producing a product of higher value than those formerly produced.

It is claimed:

1. The method of forming isoparaffinic hydrocarbons from lower boiling paraffinic and olefinic hydrocarbons comprising contacting a mixture of said lower boiling paraffinic and olefinic hydrocarbons with small particles of liquid hydrofluoric acid at a temperature above the normal boiling point of hydrofluoric acid and at a pressure slightly above the critical pressure of hydrofluoric acid at the desired reaction temperature whereby to permit substantial vaporization of hydrofluoric acid upon rise in temperature and consequent cooling of the reaction mixture.

2. Method in accordance with claim 1 in which the temperature is approximately 125° F. and the pressure is approximately 40 to 100 pounds per square inch.

3. The process of alkylating low boiling isoparaffins with low boiling olefins comprising contacting a gaseous mixture of said isoparaffins and olefins containing a large molal excess of isoparaffins in a reaction zone maintained at approximately 125° F. and 100 pounds per square inch with atomized anhydrous liquid hydrofluoric acid, said pressure being slightly above the critical pressure of the hydrofluoric acid at said temperature whereby to permit substantial evaporation of hydrofluoric acid upon rise in temperature above said temperature, and consequent cooling of the reaction mixture.

4. Method in accordance with claim 1 in which at least a portion of said lower boiling hydrocarbons are charged to said reaction zone in liquid state and in which substantially all said liquid hydrocarbons vaporize in said reaction zone.

MILTON M. MARISIC.

REFERENCES CITED

The following references are of record in the file of this patent:

UNITED STATES PATENTS

| Number | Name | Date |
|---|---|---|
| 2,001,910 | Ipatieff | May 21, 1935 |
| 2,259,723 | Ballard et al. | Oct. 21, 1941 |
| 2,317,901 | Frey | Apr. 27, 1943 |
| 2,320,629 | Matuszak | June 1, 1943 |
| 2,322,800 | Frey | June 29, 1943 |
| 2,325,052 | Grosse et al. | July 27, 1943 |
| 2,361,465 | Filbert | Oct. 31, 1944 |
| 2,365,426 | Molique | Dec. 19, 1944 |
| 2,378,439 | Schlesman | June 19, 1945 |
| 2,379,368 | Matuszak | June 26, 1945 |